Sept. 17, 1957          H. T. COTTRELL          2,806,712
STEERING GEAR FOR KNEE ACTION SUSPENSIONS IN MOTOR VEHICLES
Filed Jan. 31, 1955          2 Sheets-Sheet 1
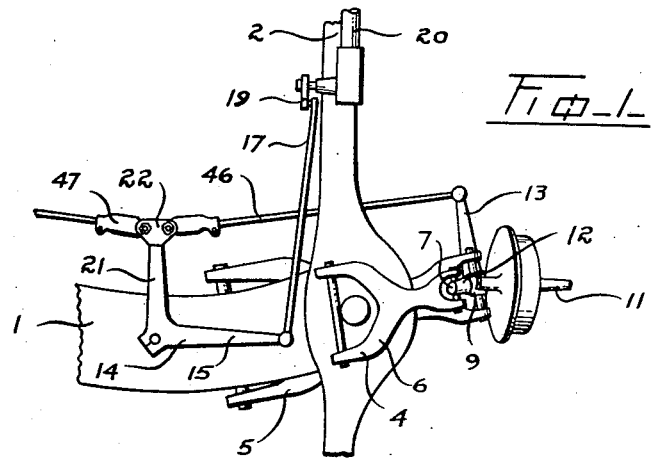
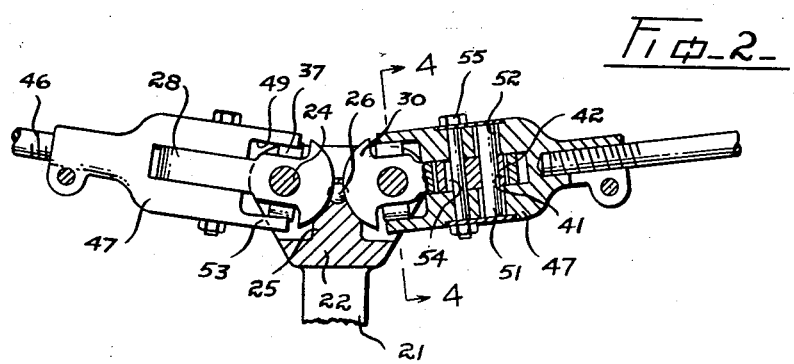
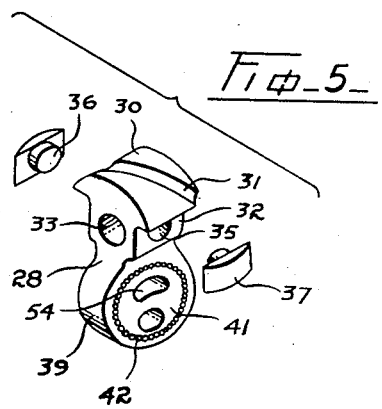
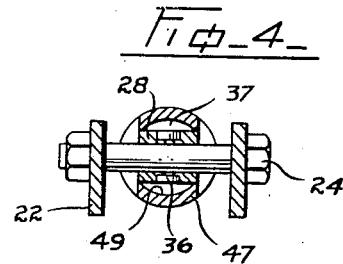
INVENTOR
HERBERT T. COTTRELL
*Ernest E Carver*
ATTORNEY Sept. 17, 1957     H. T. COTTRELL     2,806,712
STEERING GEAR FOR KNEE ACTION SUSPENSIONS IN MOTOR VEHICLES
Filed Jan. 31, 1955     2 Sheets-Sheet 2
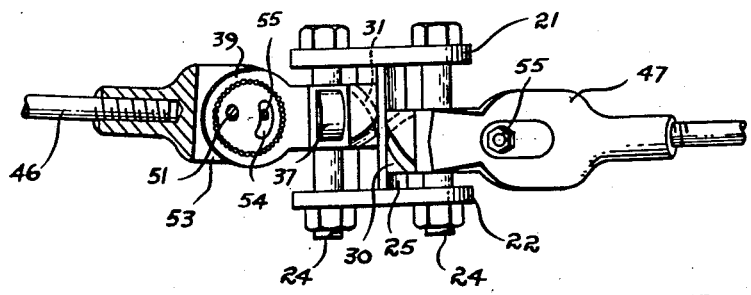
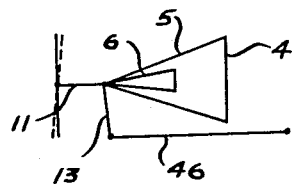
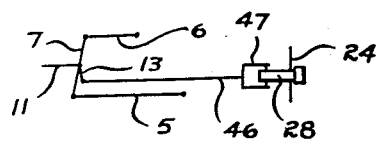
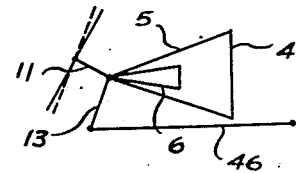
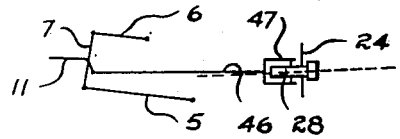
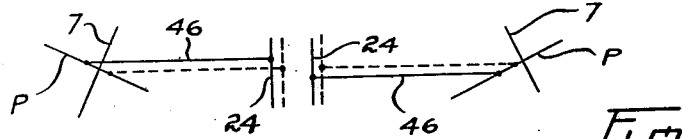
INVENTOR
HERBERT T. COTTRELL
ATTORNEY United States Patent Office 2,806,712
Patented Sept. 17, 1957

2,806,712

STEERING GEAR FOR KNEE ACTION SUSPENSIONS IN MOTOR VEHICLES

Herbert T. Cottrell, Vancouver, British Columbia, Canada

Application January 31, 1955, Serial No. 485,193

5 Claims. (Cl. 280—93)

My invention relates to improvements in steering gear for knee action suspensions in motor vehicles.

The objects of the invention are to provide means at one end of each distance rod whereby no sidewise movement or slip will occur between the front wheels and the ground, either when the wheels are being turned about their vertical axis or when one wheel is moved vertically in respect to the other due to road irregularities, such as bumps, hollows or loading, or due to unbalanced loading of the vehicle.

A further object is to provide means which by virtue of eliminating side slip or scuffing of the tires of the front wheels will materially reduce the torque required to be applied to the steering wheel of the vehicle and also effect an appreciable fuel economy.

Some of the elements to be described herein perform substantially similar functions to those referred to in my prior Patents Nos. 2,628,109, dated February 10, 1953, and 2,658,772, dated November 10, 1953, and include other elements by which vertical wheel movement relative to the vehicle chassis is not accompanied by any turning movement about the axes of the king pins unless there is simultaneous rotational movement of the steering wheel.

Referring to the accompanying drawings:

Figure 1 is a plan view of a front wheel suspension with a distance rod connecting a crank arm to the steering arm of a wheel spindle bearing.

Figure 2 is a longitudinal plan view, part in section, of the swinging joint as adapted to maintain the correct toe in of the wheel when the vehicle is being turned to right or left.

Figure 3 is an elevational view, part in section, showing the means for maintaining the distance rods substantially horizontal lengthwise when a wheel is raised or lowered relative to the movement of the wheels in turning to the right.

Figure 4 is a sectional view taken on the line 4—4 of Figure 2.

Figure 5 is a perspective view of the compensating member attached to each tie rod.

Figure 6 is a diagrammatic plan view showing the toe in effect normal in the conventional suspension resulting from a wheel riding over a bump or depression.

Figure 7 is a similar view showing the toe out effect in the conventional suspension resulting from a wheel being turned to negotiate a corner.

Figure 8 is a diagrammatic view showing the disposition of parts of the compensating member when the front wheel is aligned with the vehicle and the chassis parallel to the road surface.

Figure 9 is a diagrammatic view of the same parts showing their disposition as the wheel is passing over an obstruction.

Figure 10 is a diagrammatic view showing the function of the segmental heads of the distance rods and their connection with the head of the crank arm.

In the drawings like characters of reference indicate corresponding parts in each figure.

Referring to Figure 1, the numeral 1 indicates generally the front cross frame member of a vehicle chassis and the numeral 2 indicates a longitudinal side member thereof. Swingingly mounted at the end of the cross frame member 1 is a conventional wishbone assembly 4 which consists of a lower normally substantially horizontal link 5 and an upper link 6, the upper link being shorter than the lower link. The free ends of the links hingingly support a king pin 7 which is slightly inclined from the vertical and upon which a steering knuckle 9 is mounted for swinging movement in a slightly sloping plane. The links 5 and 6 are spring supported in the usual way to support the chassis load.

The steering knuckle 9 is provided with a wheel spindle 11 which is set at such an angle to the king pin as to cause the tire of the wheel to bear upon the ground substantially in line with the axis of the king pin. The steering knuckle is provided with a spindle bearing 12 and extending rearwardly of said bearing is a steering arm 13.

Mounted upon the cross frame member 1 is a bell crank 14 having an arm 15 which is pivotally connected to a radius rod 17. The radius rod 17 is connected to the operating crank 19 at the foot of the steering column 20. The bell crank has a rearwardly extending arm 21 provided with a head 22 which supports two vertical pins 24 and a vertical substantially triangular fin 25 in the apex of which a bearing ball 26 is rotatably mounted to project beyond the sides of said fin, as shown in Figure 2.

In the invention as here shown the bell crank 14 is pivotally mounted in the center of the cross frame member, but in some vehicles with similar front wheel suspension the bell crank is set closer to one wheel than the other, necessitating the use of two spaced crank arms connected by a radius rod and in consequence the heads to the said arms would have one pin 24 only and each would be provided with a bearing ball 26.

Slidably and rockingly mounted upon each pin 24 is a rocking or compensating member 28 which consists of a segmental head 30 having a single helical groove 31, the helices being right and left hand as shown in Figure 3. Each segmental head 30 of the member 28 has a square shank 32 which is apertured as at 33 to rockingly fit a pin 24, and is provided with circular recesses 35 which are each adapted to receive a pivot pin 36 of a segmental slipper 37. Extending from the shank 32 opposite to the segmental head 30 is a bearing ring 39 in which an eccentric 41 is rotatably mounted, the eccentric being antifriction mounted in rollers 42. Connection is made between the rocking members 28 and the steering arm 13 of the steering knuckles by distance rods 46 having at their inner ends fork members 47. Each fork member 47 is screwed onto its distance rod in the usual manner to provide for lengthwise adjustment and is slotted to receive the eccentric bearing ring 39 of the rocking member 28. The outer end of the fork member is machined to provide a longitudinally slotted circular recess 49 in which the segmental slippers 37 may move longitudinally of the recess and the distance rod. The eccentric 41 is mounted upon a pin 51 which is journalled in aligned bearings 52 carried in the side prongs 53 of the fork member 47. The eccentric is provided with an arcuate slot 54 through which a bolt 55 extends to connect the prongs 53. When the steering knuckle end of one of the distance rods 46 moves upwardly towards the cross member 1 as shown to the left of Figure 3, due to a wheel passing over a bump, the eccentric will move in a clockwise direction and cause its inner end to be drawn inwardly towards the centre of the cross member and bring the road contacting part of the tread of the complementary tire to its proper position to prevent tire scuffing. As the eccentric rocks as above described the forked member moves axially towards the segmental head 30 with the slippers 37 sliding between the side prongs 53, see Figure 4.

The normal action of the conventional steering arrangement when set to drive straight ahead would be as shown in solid lines in Figure 6 and the difference in radii of the links and the distance rod when the wheel is rising or lowering relative to the cross frame member will result in a change in the plane of the wheel to that shown in dotted line. This condition is corrected by interposing the eccentric 41 between the distance rod to crank arm joint so that a shortening of the effective length of the distance rod is produced to maintain the wheel plane in the solid line position.

It will be realized that in order to provide the front wheels with toe in and caster it is necessary for the steering knuckles to be so journalled about the king pins that the distance rod connection to the adjacent steering arm 13 will swing about its king pin in a plane which is normal to said king pin but which is sloping downwardly towards the longitudinal centre of the vehicle. Therefore, when the front wheels are set in alignment with the vehicle, both distance rods will be substantially aligned with the cross frame member 1.

In Figure 10 the letter P indicates the planes of rotation of the free end of the steering arms 13 of the steering knuckles 9 when the wheels are turned to move the vehicle to the right, with the pins 24 and head 22 moved to the left as shown in solid line. The position of said pins 24 when in centre or straight driving position are shown in dotted line, and the position of the distance rods in turning is indicated in solid line to show the left rod raised and the right rod lowered. The horizontal dotted lines show the distance rods in normal or straight driving position.

When the wheels are turned to steer to the right, the free end of the left knuckle steering arm will be raised and the right knuckle steering arm will be lowered. Obviously the raising of the steering knuckle end of one distance rod and the lowering of the other will result in the circumferential swing of the steering knuckle arm being somewhat less than that of the inner end of the distance rod. The above wheel swing shortening applies to both front wheels, consequently an extension of the axes of each of the front wheels when turned will intersect an extension of the axis of the rear wheels at different points, resulting in increased steering effort and side wear particularly on the tread of the front wheel tire on the inside of the curve travelled. By providing means whereby under circumstances as above described the inner end of the left distance rod is caused to rise as its outer end moves upwards in its inclined plane and the inner end of the right distance rod is caused to lower commensurate with the downward movement of its outer end on its inclined plane, the effective length of both distance rods will remain unchanged. In other words, both distance rods will remain horizontal when turning on an even road surface irrespective of the extent of the steering movement, consequently the turn of each wheel about its king pin will be such that when turned to any position the axes of each front wheel when extended rearwardly will intersect an extension of the axes of the rear wheels at the same point. During the above-mentioned turn to the right the members 28 are rocked about their pins 24 with the bearing ball 26 riding in the helical grooves 31, so as to cause one of said members to move upwardly of its pin and the other to simultaneously move downwardly. Thus as the members are moved relative to each other in a horizontal angular direction they are also moved with respect to each other in a vertical direction.

Referring again to Figure 10, the free ends of the steering arms 13 are shown to rotate in the planes P but in front wheel suspensions of this type, the said free ends do not travel the same distance along their inclined planes during a turn. In other words the rise and fall of the distance rods 46 above and below the dotted line position shown differs to a slight extent. To compensate for this the pitch of the helical groove 31 is not constant but varies slightly above and below the horizontal centre of the segmental head 30. In this instance the pitch of the lower half of the groove is substantially four degrees greater than that of the upper half so that during a turn the rods 46 rise and fall an appropriate distance so as to remain horizontal.

What I claim as my invention is:

1. In a steering gear for a vehicle having a cross frame member and independent wheel suspension including a pair of steering knuckles having steering arms, distance rods pivotally connected with the free ends of the steering arms, a crank arm carried by the frame member actuated from the steering wheel of the vehicle, the inner ends of the distance rods being operatively connected to the crank arm, the connection between each of the distance rods and the crank arm being by means of a vertical member having a helical groove and a second member having a fixed element engaging said groove whereby horizontal angular movement of the members with respect to each other will cause the members to move relatively to each other in a vertical direction.

2. An articulated joint for connecting an end of a distance rod of a steering gear to a swinging arm of said steering gear, said joint comprising a head adapted for mounting on the arm, said head having a vertical pin, a segmental head adapted for connection with the distance rod, having a helical groove, slidably and swingably mounted upon the pin and a groove engaging element carried in a fixed position vertically upon said arm whereby said segmental head is caused to move vertically upon the pin as the arm is rocked in response to endwise movement of the distance rod.

3. An articulated joint adapted for inclusion in a vehicle steering gear having left and right distance rods pivotally connected between a steering wheel actuated crank arm and the free end of the steering arm of a steering knuckle, said joint including a pair of members for each distance rod, one member of a pair having a non-rotatable vertical part and the other member being a segmental head having a thread in engagement with the vertical part whereby horizontal angular movement of the pairs of members with respect to each other will cause one of said members to move vertically relative to the other, the threads of one segmental head being right hand and the thread of the other being a left hand.

4. An articulated joint adapted for inclusion in a vehicle steering gear having left and right distance rods pivotally connected between a steering wheel actuated crank arm and the free end of the steering arm of a steering knuckle, said joint including a pair of members, one member having a non-rotatable vertical part and the other member having threaded engagement therewith whereby horizontal angular movement of the members with respect to each other will cause one of said members to move vertically relative to the other, said distance rod having an eccentric at one end, a bearing ring surrounding said eccentric, said ring being connected to one of the members, said eccentric being mounted for rocking movement in a vertical plane and adapted to vary the distance between pivotal points at the ends of the distance rod as one end of said distance rod is raised or lowered in response to vertical movement of its steering knuckle relative to the vehicle frame due to road shock or loading.

5. In a steering gear for a vehicle having a cross frame member and independent wheel suspension including a pair of steering knuckles having steering arms, distance rods pivotally connected with the free ends of the steering arms, a crank arm carried by the frame member actuated from the steering wheel of the vehicle, the inner ends of the distance rods being operatively connected to the crank arm, the connection between each of the distance rods and the crank arm being by means of a vertical member having a helical groove and a fixed part carried by the crank arm having an element engaging each of said grooves, the upper part of said helical groove having a pitch varying from that of the pitch of the lower part of said groove whereby the members move relatively to each other in a vertical direction through different distances as the members are rocked about a vertical axis.

References Cited in the file of this patent

UNITED STATES PATENTS

| | | |
|---|---|---|
| 2,094,824 | Sanford | Oct. 5, 1937 |
| 2,689,746 | Wagner | Sept. 21, 1954 |